United States Patent
Sengupta et al.

(10) Patent No.: US 7,689,167 B2
(45) Date of Patent: Mar. 30, 2010

(54) METHODS AND APPARATUS FOR OPERATING AN ENSEMBLE OF WIRELESS ELECTRONIC DEVICES BASED ON USER ACTIVITY

(75) Inventors: Uttam K. Sengupta, Portland, OR (US); William N. Schilit, Menlo Park, CA (US); Tanzeem K. Choudhury, Seattle, WA (US); Matthai Philipose, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 1060 days.

(21) Appl. No.: 11/187,218

(22) Filed: Jul. 22, 2005

(65) Prior Publication Data

US 2007/0021065 A1    Jan. 25, 2007

(51) Int. Cl.
*H04B 7/00* (2006.01)
(52) U.S. Cl. .................. 455/41.2; 455/41.3; 455/67.11; 455/574; 455/127.5
(58) Field of Classification Search ............. 455/67.11, 455/41.2, 41.3, 500, 515, 574, 127.5, 343.1, 455/343.5
See application file for complete search history.

(56) References Cited

U.S. PATENT DOCUMENTS

| | | | | |
|---|---|---|---|---|
| 7,395,395 | B2* | 7/2008 | Roden et al. | 711/165 |
| 2003/0013459 | A1* | 1/2003 | Rankin et al. | 455/456 |
| 2004/0147265 | A1* | 7/2004 | Kelley et al. | 455/445 |
| 2004/0259542 | A1* | 12/2004 | Viitamaki et al. | 455/426.2 |
| 2005/0075097 | A1* | 4/2005 | Lehikoinen et al. | 455/414.1 |
| 2005/0250551 | A1* | 11/2005 | Helle | 455/567 |
| 2006/0026629 | A1* | 2/2006 | Harris et al. | 725/32 |
| 2006/0148477 | A1* | 7/2006 | Reilly | 455/436 |
| 2008/0270725 | A1* | 10/2008 | Roden et al. | 711/165 |

OTHER PUBLICATIONS

Uttam K. Sengupta, et al. "Methods and Apparatus for Providing a Communication Proxy System", U.S. Appl. No. 10/976,946, filed Oct. 27, 2004.
Uttam K. Sengupta, et al. "Methods and Apparatus for Providing a Power Dashboard System", U.S. Appl. No. 10/976,935, filed Oct. 27, 2004.

* cited by examiner

*Primary Examiner*—Duc Nguyen
*Assistant Examiner*—Dominic E Rego
(74) *Attorney, Agent, or Firm*—Schwabe, Williamson & Wyatt, P.C.

(57) ABSTRACT

Embodiments of methods and apparatus for operating an ensemble of wireless electronic devices based on user activity are generally described herein. Other embodiments may be described and claimed.

30 Claims, 5 Drawing Sheets

METHODS AND APPARATUS FOR OPERATING AN ENSEMBLE OF WIRELESS ELECTRONIC DEVICES BASED ON USER ACTIVITY

TECHNICAL FIELD

The present disclosure relates generally to wireless communication systems, and more particularly, to methods and apparatus for operating an ensemble of wireless electronic devices based on user activity.

BACKGROUND

As technology advances to provide greater mobility, more and more people are carrying and using multiple wireless electronic devices (i.e., an ensemble) for a variety of reasons such as work, education, and/or entertainment. For example, a person may carry and use an ensemble of wireless electronic devices including a laptop computer, a handheld computer, a tablet computer, a wireless (e.g., cordless or cellular) telephone, a pager, an audio and/or video player (e.g., an MP3 player or a digital video disc (DVD) player), a gaming device, a digital camera, a navigation device (e.g., a global positioning system (GPS) device), and/or wireless peripherals (e.g., a headset, a keyboard, a mouse, etc.).

DETAILED DESCRIPTION

In general, methods and apparatus for operating an ensemble of wireless electronic devices based on user activity are described herein. The methods and apparatus described herein are not limited in this regard.

Figure 1:
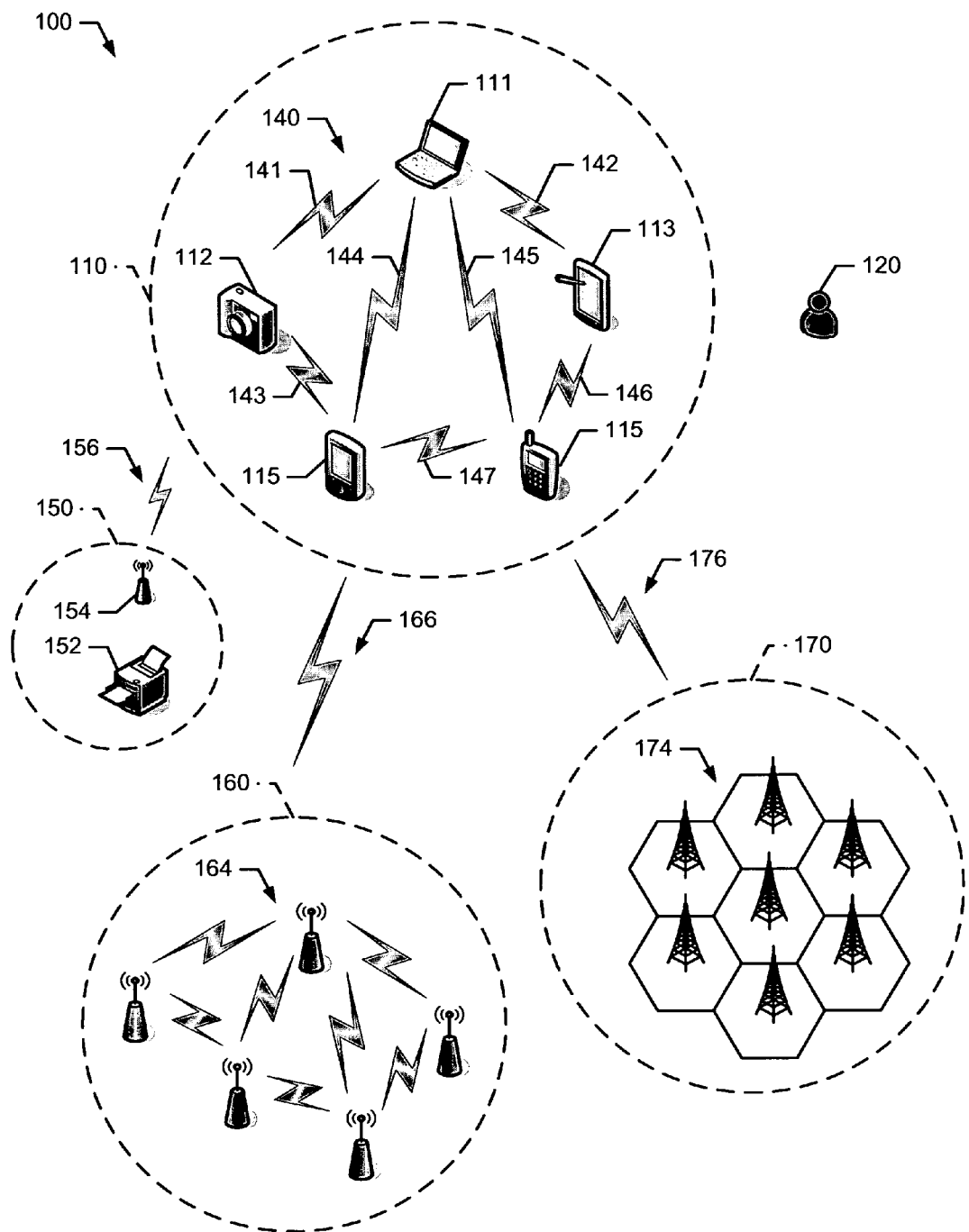
FIG. 1 is a schematic diagram representation of an example wireless communication system according to an embodiment of the methods and apparatus disclosed herein.

Referring to FIG. 1, an example wireless communication system 100 may include an ensemble of wireless electronic devices 110, generally shown as 111, 112, 113, 114, and 115. For example, the ensemble of wireless electronic devices 110 may include a laptop computer, a handheld computer, a tablet computer, a cellular telephone (e.g., a smart phone), a pager, an audio and/or video player (e.g., an MP3 player or a DVD player), a gaming device, a digital camera, a navigation device (e.g., a GPS device), a wireless peripheral (e.g., a headset, a keyboard, a mouse, etc.) and/or other suitable mobile or portable electronic devices. Alternatively, the ensemble of wireless electronic devices 110 may also include medical device(s) to monitor vital signs of a person such as heart rate, blood pressure, etc. An individual 120 may use, wear, and/or carry the ensemble of wireless electronic devices 110 to perform a variety of daily tasks for work, school, and/or leisure. Although FIG. 1 depicts five wireless electronic devices, the ensemble 110 may include more or less wireless electronic devices used, worn, and/or carried by the individual 120.

The ensemble of wireless electronic devices 110 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate with each other via wireless communication links 140 generally shown as 141, 142, 143, 144, 145, 146, and 147. Although FIG. 1 depicts seven wireless communication links, additional or fewer wireless communications links may exist.

In one example, the laptop computer 111 may implement OFDM modulation to transmit large amounts of digital data by splitting a radio frequency signal into multiple small sub-signals, which in turn, are transmitted simultaneously at different frequencies to the cellular telephone 112 via the wireless communication link 141. In particular, the ensemble of wireless electronic devices 110 may use OFDM modulation as described in the 802.xx family of standards developed by the Institute of Electrical and Electronic Engineers (IEEE) and/or variations and evolutions of these standards (e.g., 802.11x, 802.15, 802.16x, etc.) to communicate via wireless communication links 140 with each other.

For example, the ensemble of wireless electronic devices 110 may operate in accordance with the 802.16 family of standards developed by IEEE to provide for fixed, portable, and/or mobile broadband wireless access (BWA) networks (e.g., the IEEE std. 802.16, published 2004). The ensemble of wireless electronic devices 110 may also use direct sequence spread spectrum (DSSS) modulation (e.g., the EEE std. 802.11b) and/or frequency hopping spread spectrum (FHSS) modulation (e.g., the EEE std. 802.11). Although the above examples are described above with respect to standards developed by EEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). For example, the ensemble of wireless electronic devices 110 may also operate in accordance with other suitable wireless communication protocols that require very low power such as Bluetooth®, Ultra Wideband (UWB), and/or radio frequency identification (RFID) to communicate via wireless links.

Alternatively, the ensemble of wireless electronic devices 110 may communicate via wired links (not shown). For example, the ensemble of wireless electronic devices 110 may use a serial interface, a parallel interface, a small computer system interface (SCSI), an Ethernet interface, a universal serial bus (USB) interface, a high performance serial bus interface (e.g., IEEE 1394 interface), and/or any other suitable type of wired interface to communicate.

The wireless communication system 100 may also include one or more communication networks. In one example, the wireless communication system 100 may include one or more basic service set (BSS) networks, generally shown as 150. The BSS network 150 may include one or more stations, generally shown as 152. One or more of the wireless electronic devices in the ensemble 110 may be a station associated with the BSS network 150. The BSS network 150 may also include an access point (AP) 154. The AP 154 may communicate with one or more of the wireless electronic devices in the ensemble 110 via a wireless link 156.

In another example, the wireless communication system 100 may include one or more wireless mesh networks, generally shown as 160. The wireless mesh network 160 may include one or more mesh points, generally shown as 164. Although FIG. 1 depicts five mesh points, the wireless mesh network 160 may include additional or fewer mesh points. The mesh points 164 may include access points, redistribution points, end points, and/or other suitable connection points. The mesh points 164 may communicate directly or indirectly with one or more of the wireless electronic devices in the ensemble 110 via the wireless link 166.

The wireless communication system 100 may also include one or more radio access networks (RANs) such as a cellular radio network, generally shown as 170. The RAN 170 may include one or more base stations, generally shown as 174, and other radio components necessary to provide communication services to the ensemble of wireless electronic devices 110. The base stations 174 may operate in accordance with the applicable standard(s) for providing wireless communication services to the ensemble of wireless electronic devices 110. That is, one or more of the wireless electronic devices in the ensemble 110 may be configured to operate in accordance with one or more of several wireless communication protocols to communicate with the base stations 174 via a wireless link 176.

The wireless communication protocols may be based on analog, digital, and/or dual-mode communication system standards that use multiple access techniques such as frequency division multiple access (FDMA), time division multiple access (TDMA), and/or code division multiple access (CDMA). For example, the wireless communication protocols may include Global System for Mobile Communications (GSM), Wideband CDMA (W-CDMA), General Packet Radio Services (GPRS), Enhanced Data GSM Environment (EDGE), Universal Mobile Telecommunications System (UMTS), High-Speed Downlink Packet Access (HSDPA), variations and evolutions of these standards, and/or other suitable wireless communication standards.

The BSS network 150, the wireless mesh network 160, and/or the RAN 170 may be directly or indirectly coupled to each other via wireless link(s) and/or wired link(s). For example, the BSS network 150, the wireless mesh network 160, and/or the RAN 170 may be coupled to a common public or private network such as the Internet, a telephone network, a local area network (LAN), a cable network, and/or another wireless network via connection to an Ethernet, a digital subscriber line (DSL), a telephone line, a coaxial cable, and/or any wireless connection, etc.

Further, the wireless communication system 100 may include other wireless personal area network (WPAN) devices, wireless local area network (WLAN) devices, wireless metropolitan area network (WMAN) devices, and/or wireless wide area network (WWAN) devices such as network interface devices and peripherals (e.g., network interface cards (NICs)), access points (APs), gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system (not shown). Accordingly, the wireless communication system 100 may be implemented to provide WPANs, WLANs, WMANs, WWANs, and/or other suitable wireless communication networks. Although certain examples have been described above, the scope of coverage of this disclosure is not limited thereto.

Typically in an electronic device (e.g., a laptop computer), a power management application for conserving energy may operate based on a predefined time period. In particular, a monitor and/or hard disk(s) of the laptop computer may turn off after a time period (e.g., 5 minutes, 10 minutes, etc.) of user inactivity via a keyboard and/or a mouse of the laptop computer. For example, the backlight of the monitor may turn off after a lack of a keystroke, a mouse-button click, and/or a mouse-pointer/wheel movement for a time period. In a similar manner, the laptop computer may also switch from one operating mode to another operating mode (e.g., switch from an active mode to a standby mode or a hibernate mode).

As noted above, more and more people are carrying and using two or more wireless electronic devices (i.e., an ensemble) for a variety of reasons such as work, education, and/or entertainment. Accordingly, the methods and apparatus described herein may provide information indicative of user activity with respect to one wireless electronic device to one or more other wireless electronic devices as described in detail below. By sharing user activity information among an ensemble of wireless electronic devices, each wireless electronic device of the ensemble may operate dynamically based on user interaction with one of the wireless electronic devices.

Figure 2:
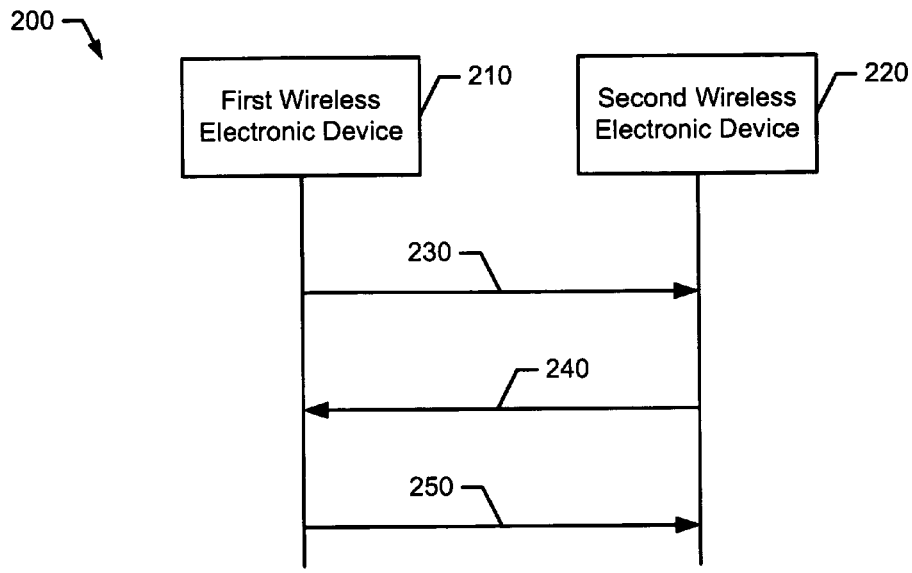
FIG. 2 is a block diagram representation of an example ensemble system.

In the example of FIG. 2, an ensemble system 200 may include two or more wireless electronic devices, generally shown as a first wireless electronic device 210 and a second wireless electronic device 220. Each of the first and second wireless electronic devices 210 and 220 may be a laptop computer, a handheld computer, a tablet computer, a cellular telephone (e.g., a smart phone), a pager, an audio and/or video player (e.g., an MP3 player or a DVD player), a gaming device, a digital camera, a navigation device (e.g., a GPS device), a wireless peripheral (e.g., a headset, a keyboard, a mouse, etc.), a medical device (e.g., a heart rate monitor, a blood pressure monitor, etc.), and/or other combination thereof. Although FIG. 2 depicts two wireless electronic devices, the ensemble system 200 may include additional wireless electronic devices.

In general, the first and second wireless electronic devices 210 and 220 may register with each other to form the ensemble system 200. Typically, most conventional wireless electronic devices may operate individually. By forming the ensemble system 200, the first and second wireless electronic devices 210 and 220 may share information such as user activity information with each other to support a variety of applications associated with the first and second wireless electronic devices 210 and 220. For example, the applications may include a power management application, a browser application (e.g., Internet browser), a processing application (e.g., word processor, spreadsheet, database, etc.), a communication service application (e.g., voice call, e-mail, instant messaging service, etc.), an entertainment application (e.g., audio and/or streaming video player), a security application (e.g., virus scan), a maintenance application (e.g., disk defragmentation, data backup, etc.), a user interface component (e.g., a graphical user interface, etc.), and/or other suitable computing applications.

In one example, the first wireless electronic device 210 may generate one or more ensemble formation messages via unicast transmission to identify wireless electronic device(s) to form the ensemble system 200 (line 230). The first wireless electronic device 210 may transmit each ensemble formation message to a particular wireless electronic device such as the second wireless electronic device 220. In another example, the first wireless electronic device 210 may also generate an ensemble formation message via broadcast transmission (e.g., a beacon signal) to identify wireless electronic device(s) to form the ensemble system 200. The first wireless electronic device 210 may broadcast the ensemble formation message, which may be received by multiple wireless electronic devices including the second wireless electronic device 220.

In response to receipt of the ensemble formation message (e.g., via unicast transmission and/or broadcast transmission), the second wireless electronic device 220 may transmit a device registration message to the first wireless electronic device 210 (line 240). For example, the device registration message may indicate to the first wireless electronic device 210 that the second wireless electronic device 220 may be within a predefined range of the first wireless electronic device 210 to form the ensemble system 220. For example, the first and second wireless electronic device 210 and 220 may be physically adjacent to each other, within line-of-sight of each other, communicatively coupled to each other, and/or other suitable proximity. In addition or alternatively, the second wireless electronic device 220 may automatically transmit the device registration message to the first wireless electronic device 210 without receiving an ensemble formation message from the first wireless electronic device 210.

The first wireless electronic device 210 may gather information regarding user activity by monitoring operating application and/or user interaction with respect to the first wireless electronic device 210. Accordingly, the first wireless electronic device 210 may communicate information indicative of user activity associated with the first wireless electronic device 210 (e.g., user activity information) to the second wireless electronic device 220 (line 250). In one example, the wireless electronic device 210 may automatically transmit the user activity information to the second wireless electronic device 220 on a periodic basis (e.g., a predefined number of seconds, minutes, etc.). In another example, the first wireless electronic device 210 may transmit the user activity information to the second wireless electronic device 220 based on a trigger event (e.g., a user input). In addition or alternatively, the first wireless electronic device 210 may transmit the user activity information to the second wireless electronic device 220 in response to a request from the second wireless electronic device 220.

The first wireless electronic device 210 may directly or indirectly communicate the user activity information to the second wireless electronic device 220. Referring back to FIG. 1, for example, the laptop computer 111 may directly communicate the user activity information to the cellular telephone 115 via the wireless link 145. In addition or alternatively, the laptop computer 111 may indirectly communicate the user activity information to the cellular telephone 115 by transmitting the user activity information to the access point 155 of the BSS network 150 via the wireless link 156. As noted above, the BSS 150 may be communicatively coupled to the RAN 170, which in turn, may transmit the user activity information to the cellular telephone 115 via the wireless link 176.

Turning back to FIG. 2, the second wireless electronic device 220 may operate a variety of applications based on the user activity information. As noted above, the second wireless electronic device 220 may support a power management application, a browser application, a processing application, a communication service application, an entertainment application, a security application, a maintenance application, a user interface component, and/or other suitable computing applications.

In one example as described in connection with FIG. 1, the first wireless electronic device 210 may be the cellular telephone 115, and the second wireless electronic device 220 may be the laptop computer 111. The cellular telephone 115 may be used by the individual 120 for voice call service, and the laptop computer 111 may be used by the individual 120 for instant messaging service. If the individual 120 is using the cellular telephone 115 for a voice call, the cellular telephone 115 may detect such user interaction and communicate corresponding user activity information to the laptop computer 111. Based on the user activity information, the laptop computer 111 may change the instant messaging status of the individual 120 to "on the phone." In a similar manner, the laptop computer 111 may change the instant messaging status of the individual 120 to "online" in response to receipt of user activity information indicating that the voice call is completed from the cellular telephone 115.

Although a particular order of actions is described with respect to FIG. 2, these actions may be performed in other temporal sequences. In one example, the first wireless electronic device 210 may begin monitoring user interaction and generating user activity information prior to formation of the ensemble system 200. In another example, the first and second wireless electronic devices 210 and 220 may form the ensemble system 200 simultaneously or concurrently with the first wireless electronic device 210 communicating information of user activity associated with the first wireless electronic device 210 to the second wireless electronic device 220. The methods and apparatus described herein are not limited this regard.

Figure 3:
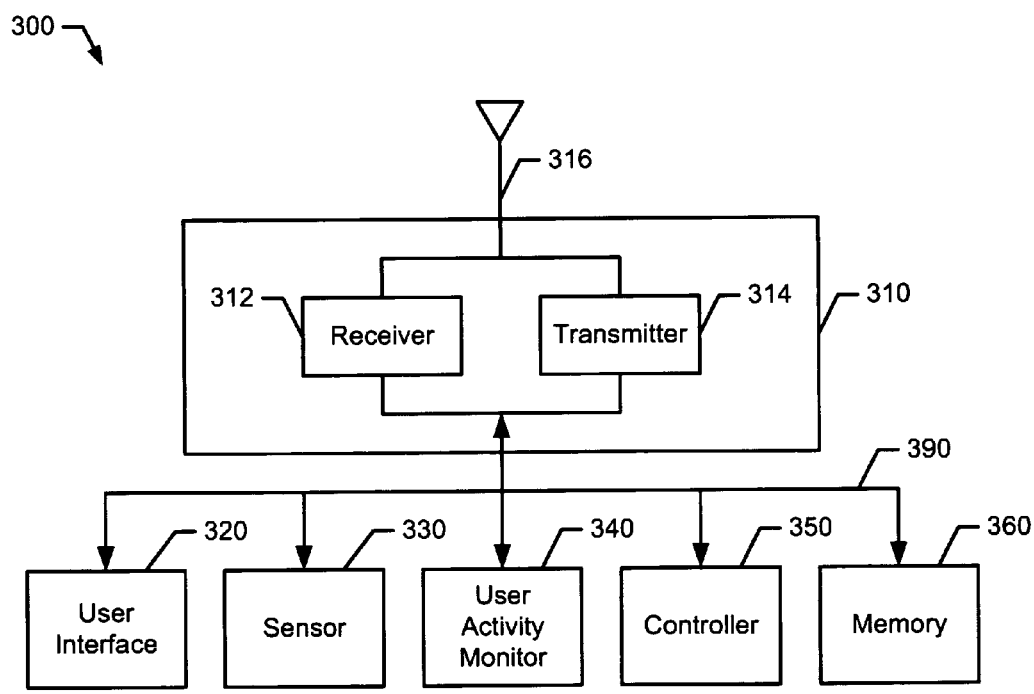
FIG. 3 is a block diagram representation of an example wireless electronic device.

Turning to FIG. 3, a wireless electronic device 300 (e.g., the first wireless electronic device 210 or the second wireless electronic device 220 of FIG. 2) may include a communication interface 310, a user interface 320, a sensor 330, a user activity monitor 340, a controller 350, and a memory 360. Although FIG. 3 depicts components of the wireless electronic device 300 coupling to each other via a bus 390, these components may be operatively coupled to each other via other suitable direct or indirect connections (e.g., a point-to-point connection).

The communication interface 310 may include a receiver 312, a transmitter 314, and an antenna 316. The communication interface 310 may receive and/or transmit ensemble formation messages, device registration messages, and/or user activity information via the receiver 312 and the transmitter 314, respectively. The antenna 316 may include one or more directional or omni-directional antennas such as dipole antennas, monopole antennas, patch antennas, loop antennas, microstrip antennas, and/or other types of antennas suitable for transmission of radio frequency (RF) signals. Although FIG. 3 depicts a single antenna, the wireless electronic device 300 may include additional antennas. For example, the wireless electronic device 300 may include a plurality of antennas to implement a multiple-input-multiple-output (MIMO) system.

The user interface 320 may be a device to receive user input at the wireless electronic device 300. For example, the user interface 320 may be an alphanumeric keyboard, a number keypad, a touchpad, a track point, a mouse, a voice recognition system, a motion detection system (e.g., recognition of gesture), a fingerprint reader, a touch-sensitive screen, a light pen, a button, a knob, a lever, etc.

In contrast to the user interface 320, the sensor 330 may monitor user interaction with respect to the wireless electronic device 300 in a passive manner (e.g., without direct user input). For example, the sensor 330 may be a motion sensor (e.g., an accelerometer), an optical sensor (e.g., a phototransistor), an acoustic sensor (e.g., a microphone), a temperature/humidity sensor (e.g., a barometer), and/or a tracking device (e.g., a compass, a GPS device, or an RFID reader/tag).

The user activity monitor 340 may monitor user activity with respect to the wireless electronic device 300 interaction(s), or lack of, with the wireless electronic device 300 (e.g., via the user interface 320 and/or the sensor 330) by an individual. The user activity monitor 340 may identify, if any, user interaction and operating application of the wireless electronic device 300 and generate corresponding user activity information. The user activity information from the first wireless electronic device 210 may include information to control a power management application, a browser application, a processing application, a communication service application, an entertainment application, a security application, and/or a maintenance application of the second wireless electronic device 220.

The controller 350 may communicate (e.g., via the communication interface 310) the user activity communication to other wireless electronic device(s). In addition or alternatively, the controller 350 may store the user activity information in the memory 360.

While the components shown in FIG. 3 are depicted as separate blocks within the wireless electronic device 300, the functions performed by some of these blocks may be integrated within a single semiconductor circuit or may be implemented using two or more separate integrated circuits. For example, although the receiver 312 and the transmitter 314 are depicted as separate blocks within the communication interface 310, the receiver 312 may be integrated into the transmitter 314 (e.g., a transceiver). In another example, although the user activity monitor 320 and the controller 330 are depicted as separate blocks, the user activity monitor 320 and the controller 330 may be integrated into a single component. The methods and apparatus described herein are not limited in this regard.

Figure 4:
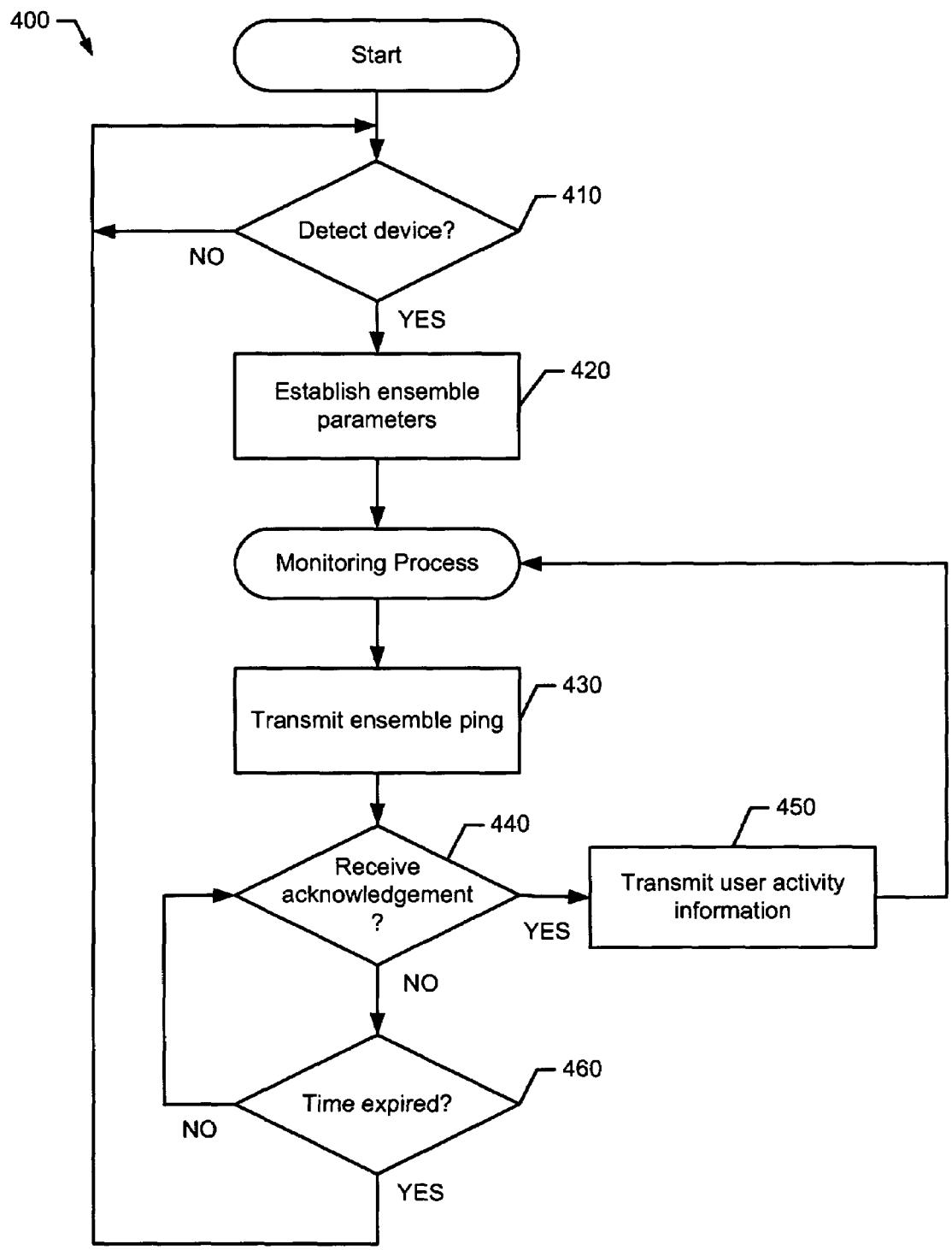
FIG. 4 is a flow diagram representation of one manner in which an example wireless electronic device of FIG. 3 may be configured to operate.

In particular, FIG. 4 depicts one manner in which the example wireless electronic device of FIG. 3 may be configured to operate. The example process 400 of FIG. 4 may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 4, these actions may be performed in other temporal sequences. Again, the example process 400 is merely provided and described in conjunction with the apparatus of FIGS. 1, 2, and 3 as an example of one way to configure a wireless electronic device to operate in the ensemble system 200.

In the example of FIG. 4, the process 400 may begin with the wireless electronic device 300 forming an ensemble of wireless electronic devices (e.g., the ensemble 110 in FIG. 1) by monitoring for another wireless electronic device (block 410). In one example, the first wireless electronic device 210 (FIG. 2) may monitor for the second wireless electronic device 220. As noted above, the first wireless electronic device 210 may monitor for the second wireless electronic device 220 on a periodic basis or in response to a trigger event based on user activity. In addition or alternatively, the first wireless electronic device 210 may detect the second wireless electronic device 220 in response to receipt of an ensemble formation request from the second wireless electronic device 220.

If the wireless electronic device 300 fails to detect another wireless electronic device to form the ensemble, the wireless electronic device 300 may return to block 410. Otherwise if the wireless electronic device 300 detects another wireless electronic device to form the ensemble at block 410, the wireless electronic device 300 may establish ensemble parameters to maintain the ensemble (block 420). For example, the first and second wireless electronic devices 210 and 220 may determine and/or negotiate with each other to establish inter-device communication within the ensemble system 200.

Figure 5:
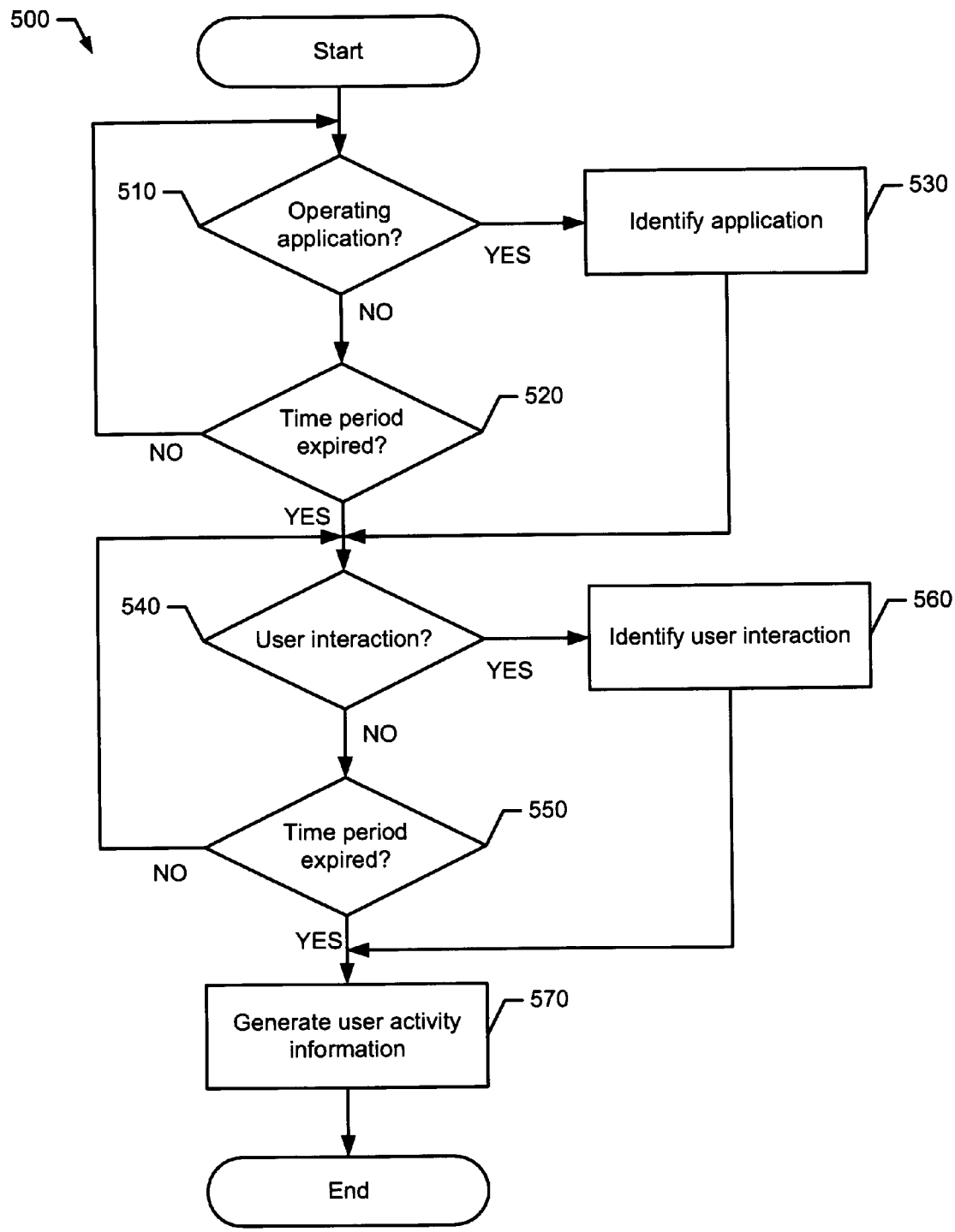
FIG. 5 is a flow diagram representation of one manner in which an example wireless electronic device of FIG. 3 may be configured to monitor user activity.

Turning to FIG. 5, the process 500 may begin with the wireless electronic device 300 (e.g., via the controller 350) determining whether an application is operating (block 510). If the wireless electronic device 300 fails to detect an operating application at block 510, the wireless electronic device 300 may determine whether a predefined time period has expired (block 520). If the time period has not expired, control may return to block 510. Otherwise, if the time period has expired, control may proceed to block 540 as described in detail below.

Referring back to block 510, if the wireless electronic device 300 detects an operating application, the wireless electronic device 300 (e.g., via the user activity monitor 340) may identify the operating application (block 530). As noted above, the application may include a power management application, a browser application (e.g., Internet browser), a processing application (e.g., word processor, spreadsheet, database, etc.), a communication service application (e.g., voice call, e-mail, instant messaging service, etc.), an entertainment application (e.g., audio and/or streaming video player), a security application (e.g., virus scan), a maintenance application (e.g., disk defragmentation), and/or other suitable computing applications.

The wireless electronic device 300 (e.g., via the user interface 320 and/or the sensor 330) may monitor for user interaction (block 540). If the wireless electronic device 300 fails to detect user interaction at block 540, the wireless electronic device 300 may determine whether a predefined time period has expired (block 550). If the time period has not expired, control may return to block 540. Otherwise, if the time period has expired, control may proceed to block 570 as described in detail below.

Turning back to block 540, if the wireless electronic device 300 detects user interaction, the wireless electronic device 300 may identify the user interaction (block 560). Based on the identified operating application (i.e., block 530) and the identified user interaction (i.e., block 560), the wireless electronic device 300 (e.g., via the user activity monitor 340) may generate user activity information associated with the identified operating application and the identified user interaction (block 570). As noted above, the user activity information may include information to control at least one of a power management application, a browser application, a processing application, a communication service application, an entertainment application, a security application, or a maintenance application of another wireless electronic device in the ensemble (e.g., the second wireless electronic device 220 of FIG. 2).

In one example, the first wireless electronic device 210 may provide information to the second wireless electronic device 220 so that the second wireless electronic device 220 may determine a manner in which to operate. In particular, the user activity information may include an application identifier and/or a user interaction identifier. The application identifier may indicate the operating application such as voice call, instant messaging, etc. The user interaction identifier may indicate the user interaction such as active, inactive, idle, online, etc. Based on the user activity information, the second wireless electronic device 220 may determine to operate in a manner to conserve power, to accommodate the schedule of the user, etc.

Alternatively, the first wireless electronic device 210 may provide information to the second wireless electronic device 220 so that the first wireless electronic device 210 may instruct the second wireless electronic device 220 to operate in a particular manner defined by the first wireless electronic device 210. The user activity information may include an instruction or a command indicative of a manner to operate. For example, the user activity information from the first wireless electronic device 210 may explicitly instruct the second wireless electronic device 220 to operate in an active mode, a standby mode, a hibernate mode, etc. The methods and apparatus described herein are not limited in this regard.

Referring back to FIG. 4, the wireless electronic device 300 may transmit a probe message (e.g., a ping) to determine whether to proceed with transmitting the user activity information (block 430). For example, the first wireless electronic device 210 may transmit an ensemble ping to the second wireless electronic device 220 to determine whether the second wireless electronic device 220 is still a part of the ensemble system 200. The wireless electronic device 300 may monitor for an acknowledgement in response to the ensemble ping (block 440). Following the above example, the first wireless electronic device 210 may monitor for an acknowledgement from the second wireless electronic device 220. A failure to receive an acknowledgement from the second wireless electronic device 220 may indicate to the first wireless electronic device 210 that the second wireless electronic device 220 is no longer a part of the ensemble system 200. Thus, communicating the user activity information to the second wireless electronic device 220 may not be necessary.

If the wireless electronic device 300 receives an acknowledgement at block 440, the wireless electronic device 300 may proceed to transmit the user activity information (block 450). The wireless electronic device 300 may return to the monitoring process 500 to update the user activity information. Otherwise if the wireless electronic device 300 fails to receive an acknowledgement at block 440, the wireless electronic device 300 may determine whether a predefined time period has expired (block 460).

If the wireless electronic device 300 determines that the predefined time period has not expired at block 460, controls may return to block 440 to monitor for an acknowledgement to the ensemble ping. Otherwise if the wireless electronic device 300 determines that the predefined time period has expired at block 460, controls may return to block 410 to monitor for another wireless electronic device. The methods and apparatus described herein are not limited in this regard.

While the methods and apparatus disclosed herein are described in FIGS. 4 and 5 to operate in a particular manner, the methods and apparatus disclosed herein are readily applicable without certain blocks depicted in FIGS. 4 and 5. In one example, the wireless electronic device 300 may transmit the user activity information (block 450) without transmitting an ensemble ping (block 430) and monitoring for an acknowledgement (block 440).

Further, although the methods and apparatus disclosed herein are described with respect to portable and/or mobile electronic devices, the methods and apparatus disclosed herein are readily applicable to many other types of wireless electronic devices such as fixed devices, relatively stationary devices, etc. For example, the methods and apparatus disclosed herein may be implemented to desktop computers, multimedia computers or servers, televisions, display monitors, projectors, set-top boxes, gaming consoles, personal video recorders, digital video recorders, etc. The methods and apparatus described herein are not limited in this regard.

Figure 6:
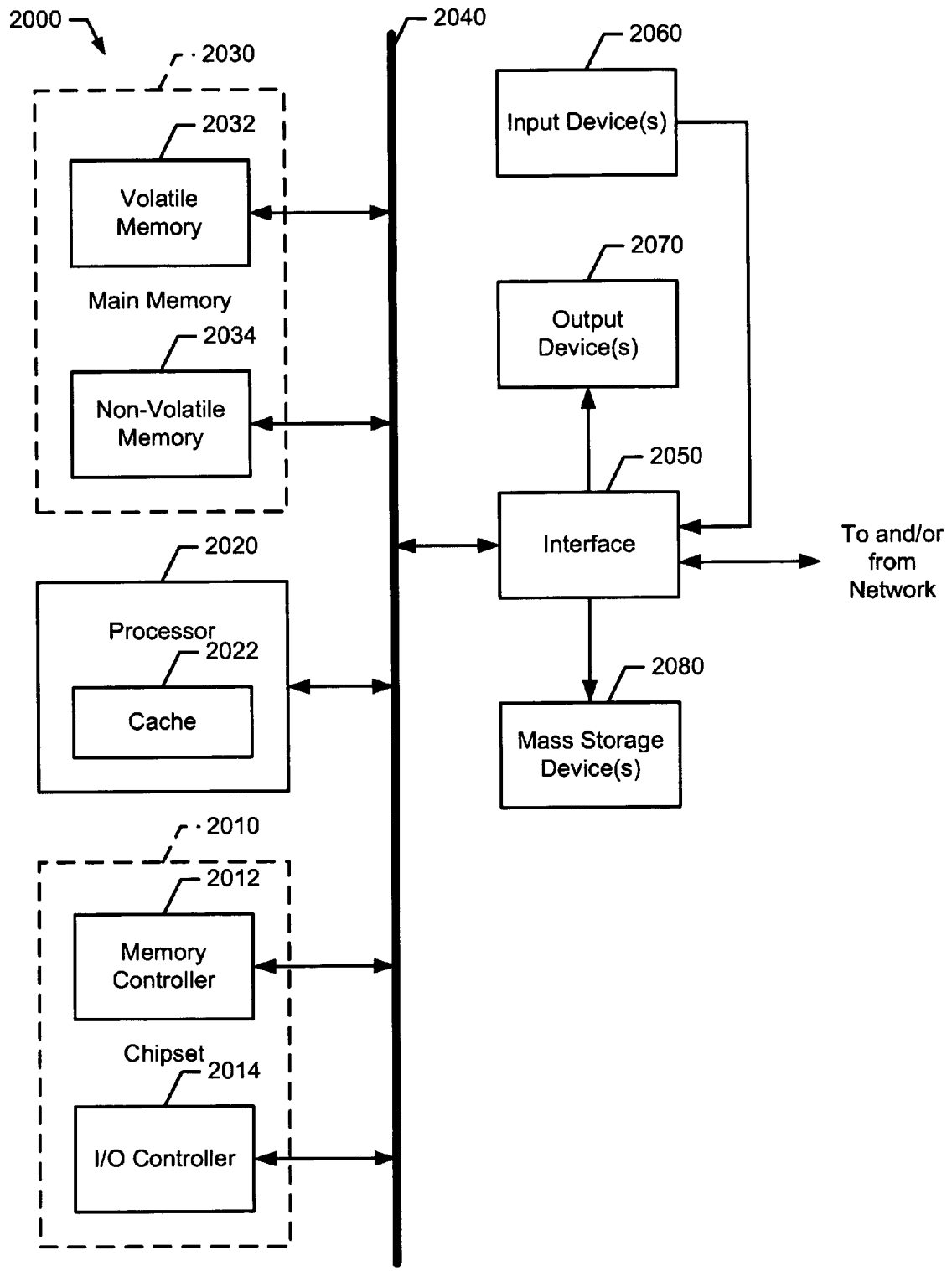
FIG. 6 is a block diagram representation of an example processor system that may be used to implement an example wireless electronic device of FIG. 3.

FIG. 6 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 6 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 6 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
  registering a first wireless electronic device with a second wireless electronic device to form an ensemble of wireless electronic devices;
  monitoring user activity associated with the first wireless electronic device of the ensemble of wireless electronic devices;
  transmitting, by the first wireless electronic device, a probe message to the second wireless electronic device to determine whether the second wireless electronic device is still a part of the ensemble of wireless electronic devices;
  verifying, by the first wireless electronic device, based at least in part on an acknowledgement received by the first wireless electronic device from the second wireless electronic device in response to the probe message, that the second wireless electronic device is still a part of the ensemble of wireless electronic devices; and
  after said transmitting the probe message and said verifying, communicating user activity information based on an operating application associated with the first wireless electronic device from the first wireless electronic device to the second wireless electronic device for enabling the second wireless electronic device to perform an action based on the user activity information.

2. A method as defined in claim 1, wherein said monitoring the user activity associated with the first wireless electronic device comprises detecting at least one of a condition indicative of user interaction with the first wireless electronic device or a condition indicative of a lack of user interaction with the first wireless electronic device.

3. A method as defined in claim 1, wherein said communicating the user activity information from the first wireless electronic device to the second wireless electronic device comprises communicating at least one of information associated with a condition indicative of user interaction with the first wireless electronic device or information associated with a condition indicative of a lack of user interaction with the first wireless electronic device.

4. A method as defined in claim 1, wherein said communicating the user activity information from the first wireless electronic device to the second wireless electronic device comprises communicating information to the second wireless electronic device to control at least one of a power management application, a browser application, a processing application, a communication service application, an entertainment application, a security application, a maintenance application, or a user interface component of the second wireless electronic device.

5. A method as defined in claim 1 further comprising generating the user activity information at the first wireless electronic device based on user interaction with respect to the first wireless electronic device, wherein the user activity information comprises information to control at least one of a power management application, a browser application, a processing application, a communication service application, an entertainment application, a security application, a maintenance application, or a user interface component of the second wireless electronic device.

6. A method as defined in claim 1, wherein the ensemble of wireless electronic devices comprises one or more of a laptop computer, a handheld computer, a tablet computer, a personal data assistant, a wireless telephone, a pager, an audio/video player, a gaming device, a digital camera, a navigation device, a wireless peripheral, or a medical device.

7. A method as defined in claim 1, further comprising registering a first wireless electronic device with a second wireless electronic device to form the ensemble of wireless electronic devices.

8. A method as defined in claim 7, wherein said registering the first wireless electronic device with the second wireless electronic device comprises:
  transmitting, by the first wireless electronic device, an ensemble formation message to the second wireless electronic device; and
  receiving, by the first wireless electronic device, a device registration message responsive at least in part to the ensemble formation message, from the second wireless electronic device.

9. A method as defined in claim 1, further comprising:
receiving, by the first wireless electronic device, a request from the second wireless electronic device to transmit the user activity information;
wherein said communicating the user activity information is performed only after said receiving the request to transmit the user activity information.

10. An article of manufacture comprising:
a storage medium; and
a plurality of programming instructions stored on the storage medium and configured to program a computing device to:
registering a first wireless electronic device with a second wireless electronic device to form an ensemble of wireless electronic devices;
monitor user activity associated with the first wireless electronic device of the ensemble of wireless electronic devices;
transmit, by the first wireless electronic device, a probe message to the second wireless electronic device to determine whether the second wireless electronic device is still a part of the ensemble of wireless electronic devices;
verify, by the first wireless electronic device, based at least in part on an acknowledgment received by the first wireless electronic device from the second wireless electronic device in response to the probe message, that the second wireless electronic device is still a part of the ensemble of wireless electronic devices; and
after said transmitting the probe message and said verifying, communicate user activity information based on an operating application associated with the first wireless electronic device from the first wireless electronic device to the second wireless electronic device for enabling the second wireless electronic device to perform an action based on the user activity information.

11. An article of manufacture as defined in claim 10, wherein the plurality of programming instructions are configured to program a computing device to monitor the user activity associated with the first wireless electronic device by detecting at least one of a condition indicative of user interaction with the first wireless electronic device or a condition indicative of a lack of user interaction with the first wireless electronic device.

12. An article of manufacture as defined in claim 10, wherein the plurality of programming instructions are configured to program a computing device to communicate the user activity information from the first wireless electronic device to the second wireless electronic device by communicating at least one of information associated with a condition indicative of user interaction with the first wireless electronic device or information associated with a condition indicative of a lack of user interaction with the first wireless electronic device.

13. An article of manufacture as defined in claim 10, wherein the plurality of programming instructions are configured to program a computing device to communicate information to second wireless electronic device to control at least one of a power management application, a browser application, a processing application, a communication service application, an entertainment application, a security application, a maintenance application, or a user interface component of the second wireless electronic device.

14. An article of manufacture as defined in claim 10, wherein the plurality of programming instructions are configured to program a computing device to identify the operating application or a user interaction associated with the first wireless electronic device.

15. An article of manufacture as defined in claim 10, wherein the plurality of programming instructions are configured to program a computing device to generate the user activity information at the first wireless electronic device based on user interaction with respect to the first wireless electronic device, and wherein the user activity information comprises information to control at least one of a power management application, a browser application, a processing application, a communication service application, an entertainment application, a security application, a maintenance application, or a user interface component of the second wireless electronic device.

16. An article of manufacture as defined in claim 10, wherein the ensemble of wireless electronic devices comprises one or more of a laptop computer, a handheld computer, a tablet computer, a personal data assistant, a wireless telephone, a pager, an audio/video player, a gaming device, a digital camera, a navigation device, a wireless peripheral, or a medical device.

17. An apparatus comprising:
a user activity monitor to monitor user activity associated with a first wireless electronic device of an ensemble of wireless electronic devices; and
a communication interface coupled to the user activity monitor to:
transmit, by the first wireless electronic device, a probe message to a second wireless electronic device to determine whether the second wireless electronic device is still a part of the ensemble of wireless electronic devices;
verify, by the first wireless electronic device, based at least in part on an acknowledgement received by the first wireless electronic device from the second wireless electronic device in response to the probe message, that the second wireless electronic device is still a part of the ensemble of wireless electronic devices; and
after said transmitting the probe message and said verifying, communicate user activity information based on an operating application associated with the first wireless electronic device from the first wireless electronic device to a second wireless electronic device of the ensemble of wireless electronic devices for enabling the second wireless electronic device to perform an action based on the user activity information.

18. An apparatus as defined in claim 17, wherein the user activity monitor is configured to detect at least one of a condition indicative of user interaction with the first wireless electronic device or a condition indicative of a lack of user interaction with the first wireless electronic device.

19. An apparatus as defined in claim 17, wherein the user activity monitor is configured to generate the user activity information at the first wireless electronic device based on user interaction with respect to the first wireless electronic device, and wherein the user activity information comprises information to control at least one of a power management application, a browser application, a processing application, a communication service application, an entertainment application, a security application, a maintenance application, or a user interface component of the second wireless electronic device.

20. An apparatus as defined in claim 17, wherein the user activity monitor is configured to identify the operating application or a user interaction associated with the first wireless electronic device.

21. An apparatus as defined in claim 17, wherein the communication interface is configured to communicate at least one of information associated with a condition indicative of user interaction with the first wireless electronic device or information associated with a condition indicative of a lack of user interaction with the first wireless electronic device.

22. An apparatus as defined in claim 17, wherein the communication interface is configured to communicate the user activity information to the second wireless electronic device via at least one of a wireless link or a wired link.

23. An apparatus as defined in claim 17, further comprising a user interface to receive user input at the first wireless electronic device, wherein the user interface comprises at least one of an alphanumeric keyboard, a number keypad, a touchpad, a track point, a mouse, a voice recognition system, a motion detection system, a fingerprint reader, a touch-sensitive screen, a light pen, a button, a knob, or a lever.

24. An apparatus as defined in claim 17 further comprising a sensor to monitor user interaction with respect to the wireless electronic device, wherein the sensor comprises at least one of a motion sensor, an optical sensor, an acoustic sensor, a temperature sensor, a humidity sensor, or a tracking device.

25. An apparatus as defined in claim 17, wherein the apparatus is integrated into at least one of a laptop computer, a handheld computer, a tablet computer, a personal data assistant, a wireless telephone, a pager, an audio/video player, a gaming device, a digital camera, a navigation device, a wireless peripheral, or a medical device.

26. A system comprising:
a flash memory; and
a processor coupled to the flash memory to:
registering a first wireless electronic device with a second wireless electronic device to form an ensemble of wireless electronic devices;
monitor user activity associated with the first wireless electronic device of the ensemble of wireless electronic devices,
transmit, by the first wireless electronic device, a probe message to the second wireless electronic device to determine whether the second wireless electronic device is still a part of the ensemble of wireless electronic devices,
verify, by the first wireless electronic device, based at least in part on an acknowledgement received by the first wireless electronic device from the second wireless electronic device in response to the probe message, that the second wireless electronic device is still a part of the ensemble of wireless electronic devices, and
after said transmitting the probe message and said verifying, communicate user activity information based on an operating application associated with the first wireless electronic device from the first wireless electronic device to the second wireless electronic device for enabling the second wireless electronic device to perform an action based on the user activity information.

27. A system as defined in claim 26, wherein the processor is configured to detect at least one of a condition indicative of user interaction with the first wireless electronic device or a condition indicative of a lack of user interaction with the first wireless electronic device.

28. A system as defined in claim 26, wherein the processor is configured to identify the operating application or a user interaction associated with the first wireless electronic device.

29. A system as defined in claim 26, wherein the processor is configured to generate the user activity information based on user interaction with respect to the first wireless electronic device, and wherein the user activity information comprises information to control at least one of a power management application, a browser application, a processing application, a communication service application, an entertainment application, a security application, a maintenance application, or a user interface component of the second wireless electronic device.

30. A system as defined in claim 26, wherein the flash memory is configured to store the user activity information, and wherein the user activity information comprises an operating application identifier and a user interaction identifier.

* * * * *